United States Patent
Fäcke et al.

(10) Patent No.: US 8,957,176 B2
(45) Date of Patent: Feb. 17, 2015

(54) BLOCKED POLYISOCYANATES CURING FREE FROM ELIMINATION PRODUCTS FOR DUALCURE SYSTEMS

(75) Inventors: Thomas Fäcke, Bridgeville, PA (US); Jan Weikard, Odenthal (DE); Wolfgang Fischer, Meerbusch (DE)

(73) Assignee: ALLNEX IP S.à.r.L., Luxembourg (LU)

( * ) Notice: Subject to any disclaimer, the term of this patent is extended or adjusted under 35 U.S.C. 154(b) by 0 days.

(21) Appl. No.: 11/219,395

(22) Filed: Sep. 2, 2005

(65) Prior Publication Data

US 2006/0052573 A1    Mar. 9, 2006

(30) Foreign Application Priority Data

Sep. 8, 2004    (DE) .......................... 10 2004 043 363

(51) Int. Cl.
| | | |
|---|---|---|
| *C08G 18/80* | (2006.01) | |
| *C08L 75/04* | (2006.01) | |
| *C09D 175/04* | (2006.01) | |
| *C07C 269/00* | (2006.01) | |
| *C07C 271/00* | (2006.01) | |

(52) U.S. Cl.
USPC .............. 528/45; 528/73; 528/75; 540/202; 544/67; 544/222; 548/951; 548/952; 560/115; 560/157; 560/158; 564/38; 564/44

(58) Field of Classification Search
USPC ........... 525/126, 440.02; 522/90; 428/424.2; 528/45, 75, 73; 540/202; 544/67, 222; 548/951, 952; 560/115, 157, 158; 564/38, 44
See application file for complete search history.

(56) References Cited

U.S. PATENT DOCUMENTS

| | | | | |
|---|---|---|---|---|
| 3,499,852 A | * | 3/1970 | Krawczyk et al. ............... 528/45 |
| 4,173,682 A | | 11/1979 | Noomen et al. ............... 428/423 |
| 4,485,226 A | | 11/1984 | Noll et al. ....................... 528/45 |
| 4,659,795 A | * | 4/1987 | Tsutsui et al. ................. 526/301 |
| 4,961,960 A | * | 10/1990 | Iimure .......................... 427/520 |
| 5,185,403 A | * | 2/1993 | Lewarchik et al. ............ 525/199 |
| 5,244,979 A | * | 9/1993 | Yamamoto et al. ......... 525/329.7 |
| 5,364,891 A | * | 11/1994 | Pears et al. .................... 522/149 |
| 6,037,440 A | * | 3/2000 | Wilson et al. .................. 528/243 |
| 6,060,573 A | | 5/2000 | König et al. ..................... 528/45 |
| 6,465,539 B1 | | 10/2002 | Weikard et al. ................. 522/90 |
| 6,617,413 B1 | | 9/2003 | Bruchmann et al. ............ 528/75 |
| 2002/0198314 A1 | | 12/2002 | Meisenburg et al. ......... 524/589 |
| 2004/0132909 A1 | | 7/2004 | Weikard et al. ............... 525/126 |

FOREIGN PATENT DOCUMENTS

CA    2 258 813 A1    7/1999

OTHER PUBLICATIONS

Moszner, Nobert; Zeuner, Frank; Salz, Ulrich; Volker Rheinberger. "Reaction Behaviour of Monomeric beta-Ketoesters". Polymer Bulletin: vol. 33 (1994): 43-49.*
Szycher, Michael; Szycher's Handbook of Polyurethanes; CRC Press; New York; 1999; pp. 4-15-4-17.*
Oertel; Polyurethane Handbook: Chemistry—Raw Materials—Processing—Applications—Properties; Hanser Publishers; New York; 1985; pp. 510-514.*
Database WPI Week 199518 Derwent Publication Ltd., London, GB; AN 1995-136887 XP002359054 "Soft polyurethane foam car part" & JP 07 062051 A (Polyurethane Kasei) Mar. 7, 1995.

* cited by examiner

*Primary Examiner* — Rabon Sergent
(74) *Attorney, Agent, or Firm* — Drinker Biddle & Reath LLP

(57) ABSTRACT

The invention provides innovative blocked polyisocyanates whose crosslinking is initiated thermally and photochemically. The polyisocyanates comprise at least one thermally reversibly blocked NCO group whose blocking agent contains at least one group which on exposure to actinic radiation reacts, with polymerization, with ethylenically unsaturated compounds. A process for preparing the polyisocyanates, and their use in binders, is also provided.

18 Claims, No Drawings

BLOCKED POLYISOCYANATES CURING FREE FROM ELIMINATION PRODUCTS FOR DUALCURE SYSTEMS

CROSS-REFERENCE TO RELATED APPLICATION

This application claims priority to Germany Application DE 10 2004 043 303.1, filed Sep. 8, 2004.

FIELD OF THE INVENTION

The invention relates to innovative blocked polyisocyanates whose crosslinking is initiated thermally and photochemically, to a process for preparing them and to their use in binders.

BACKGROUND OF THE INVENTION

Coating materials which cure by two independent processes are referred to generally as dual-cure systems. Customarily the binder components present possess different functional groups, which under suitable conditions, generally independently of one another, react with one another and, in so doing, crosslink. Customary prior-art dual-cure systems possess radiation-curing and thermally curing groups, with particularly advantageous properties being obtained when using isocyanate groups and hydroxyl groups as thermally crosslinking functions.

EP-A 0 928 800 describes a dual-cure system which comprises a crosslinker that contains both radiation-curing acrylate groups and free isocyanate groups which can be cured thermally using suitable binders, e.g. OH-containing binders. Since NCO groups and OH groups react with one another even at room temperature, the aforementioned coating system can be employed only as a two component system in which NCO-containing and NCO-reactive constituents are mixed with one another shortly before or during the coating operation. The disadvantage of a very short processing time for these systems can be alleviated by blocking the free NCO groups. The combination of such radiation-curing and heat-curing systems containing blocked isocyanate groups is described for example in EP-A-126 359, WO-A 01/42329 or U.S. Pat. No. 4,961,960.

In the case of the majority of prior-art blocked polyisocyanates the blocking agents present are eliminated during the crosslinking reaction and then released. On the one hand this adversely affects the VOC content of the coating systems; on the other, eliminated blocking agent remains in the paint film, thereby adversely affecting the properties of the coating. As a result, scratch resistance and acid stability of one-component (1K) paint films are generally significantly poorer than in the case of two-component (2K) polyurethane coatings (e.g. T. Engbert, E. König, E. Jürgens, Farbe & Lack, Curt R. Vincentz Verlag, Hanover October 1995). The elimination of the blocking agent and its gaseous escape from the paint film may lead, furthermore, to blistering in the paint. Subsequent incineration of the emitted blocking agent may possibly be necessary.

For particularly low crosslinking temperatures in the range from 90 to 120° C., use has been made more recently of diethyl malonate blocked isocyanates (e.g. EP-A 0 947 531). In contrast to blocking with, for example, N-heterocyclic compounds, such as caprolactam or butanone oxime, in this case the blocking agent is not completely eliminated; instead, in the course of curing, there is a transesterification on the diethyl malonate, with elimination of ethanol. A disadvantage, however, is that, because of the labile ester bond, such systems are extremely susceptible to acid exposure, and so the application possibilities of these products are limited.

The object on which the present invention is based was therefore to provide new blocked polyisocyanates which cure both thermally and photochemically and at the same time this process proceeds without emissions.

SUMMARY OF THE INVENTION

It has now been found that the stated object can be achieved by means of polyisocyanates some or all of whose NCO groups have been thermally reversibly blocked, these polyisocyanates comprising in the blocking agent and optionally in the polymer backbone at least one group which on exposure to actinic radiation reacts, with polymerization, with ethylenically unsaturated compounds (radiation-curing group).

The invention provides polyisocyanates which

A) comprise optionally one or more than one group which on exposure to actinic radiation reacts, with polymerization, with ethylenically unsaturated compounds (radiation-curing group) and B) comprise at least one thermally reversibly blocked NCO group whose blocking agent contains at least one group which on exposure to actinic radiation reacts, with polymerization, with ethylenically unsaturated compounds (radiation-curing group).

The invention further provides a process for preparing the polyisocyanates of the invention which involves reacting with one another A1) one or more organic polyisocyanates with A2) optionally one or more compounds which comprise at least one isocyanate-reactive group and contain at least one group which on exposure to actinic radiation reacts, with polymerization, with ethylenically unsaturated compounds (radiation-curing group), A3) optionally further isocyanate-reactive compounds other than the compounds of component A2), and A4) a blocking agent component comprising at least one blocking agent that thermally reversibly blocks NCO groups and at the same time comprises at least one group which on exposure to actinic radiation reacts, with polymerization, with ethylenically unsaturated compounds (radiation-curing group)

A5) optionally in the presence of one or more catalysts and

A6) optionally solvents, reactive diluents and/or auxiliaries and additives.

The invention additionally provides coating materials comprising

B1) one or more polyisocyanates of the invention,

B2) one or more compounds comprising at least one isocyanate-reactive group and containing optionally one or more functional groups which on exposure to actinic radiation react, with polymerization, with ethylenically unsaturated compounds, B3) optionally compounds which carry functional groups which on exposure to actinic radiation react, with polymerization, with ethylenically unsaturated compounds and which contain neither NCO groups nor NCO-reactive groups, B4) optionally catalysts and B5) optionally auxiliaries and additives

DETAILED DESCRIPTION OF PREFERRED EMBODIMENTS

As used herein, as used in the examples or unless otherwise expressly specified, all numbers may be read as if prefaced by the word "about", even if the term does not expressly appear. Also, any numerical range recited herein is intended to include all sub-ranges subsumed therein.

By groups which on exposure to actinic radiation react, with polymerization, with ethylenically unsaturated compounds (radiation-curing groups) are meant preferably allyl, vinyl, acryloyl, methacryloyl, maleyl and fumaryl groups, more preferably maleyl, fumaryl, acryloyl and methacryloyl groups. Especially preferred radiation-curing groups are acryloyl and methacryloyl groups, which are also referred to below in a simplified form as (meth)acryloyl groups. By actinic radiation is meant electromagnetic, ionizing radiation, especially electron beams, UV rays and also visible light (Roche Lexikon Medizin, 4th edition; Urban & Fischer Verlag, Munich 1999).

By NCO groups which have been thermally reversibly blocked are meant NCO groups which have been blocked/deactivated by reaction with a suitable blocking agent and which by exposure to temperatures of 40-200° C. eliminate some or all of this blocking agent again, so resulting in reactive groups, especially free NCO groups, which react with isocyanate-reactive groups.

By isocyanate-reactive groups for the purposes of the invention are meant all functionalities which react with NCO functions at temperatures from 0 to 200° C., where appropriate with acceleration using catalysts known to the skilled person from polyurethane chemistry. Examples of these functionalities include the following: hydroxyl, amino, aspartato and thiol groups and also systems containing β-amino alcohols, such as tetrakishydroxyethylene-ethylenediamine, for example, or else dialkylaminoethanol or aminoethanol. Hydroxyl groups are preferred.

To prepare the polyisocyanates of the invention it is possible as component A1) to use all organic compounds containing isocyanate groups, preferably aliphatic, cycloaliphatic, aromatic or heterocyclic polyisocyanates with an NCO functionality ≥2, individually or in any desired mixtures with one another, it being unimportant whether they have been prepared by phosgenation or by phosgene-free processes.

Likewise highly suitable are polyisocyanates with a uretdione, carbodiimide, isocyanurate, iminooxadiazinedione, biuret, urethane, allophanate, oxadiazinetrione or acylurea structure and also polyisocyanate prepolymers with an average NCO functionality >1, such as they are obtainable by preliminary reaction of a molar excess of one of the abovementioned polyisocyanates in a manner known per se.

For the purposes of the invention it is preferred in A1) to use compounds of the aforementioned kind having a molecular weight of 140 to 4000 g/mol and containing aliphatically, cycloaliphatically, araliphatically and/or aromatically attached isocyanate groups.

Examples of aliphatic and cycloaliphatic isocyanates of component A1) are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Bayer AG, Leverkusen), 4-isocyanatomethyl-1,8-octane diisocyanate (triisocyanatononane, TIN), ω,ω'-diisocyanato-1,3-dimethylcyclohexane ($H_6$XDI), 1-isocyanato-1-methyl-3-isocyanatomethylcyclohexane, 1-isocyanato-1-methyl4-isocyanatomethylcyclohexane, bis(isocyanatomethyl)norbornane are used.

Examples of aromatic isocyanates of component A1) are 1,5-naphthalene diisocyanate, 1,3- and 1,4-bis(2-isocyanatoprop-2-yl)benzene (TMXDI), 2,4- and 2,6-diisocyanatotoluene (TDI), particularly the 2,4 and the 2,6 isomer and technical mixtures of the two isomers, 2,4'- and 4,4'-diisocyanatodiphenylmethane (MDI), 1,5-diisocyanatonaphthalene, 1,3-bis(isocyanatomethyl)benzene (XDI) are employed.

In component A1) it is particularly preferred to use polyisocyanates or polyisocyanate mixtures of the stated kind containing exclusively aliphatically and/or cycloaliphatically attached isocyanate groups, particularly those based on hexamethylene diisocyanate (HDI), isophorone diisocyanate (IPDI) and/or 4,4'-diisocyanatodicyclohexylmethane.

In component A2) it is possible to use all compounds, individually or in any desired mixtures, which contain at least one isocyanate-reactive group and at least one unsaturated function which on exposure to actinic radiation reacts, with polymerization, with ethylenically unsaturated compounds.

Preferred for use as compounds of component A2) are α,β-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units, which contain at least one isocyanate-reactive group; with particular preference these are acrylates and methacrylates having at least one isocyanate-reactive group.

Examples of compounds of component A2) are 3-isocyanatopropyl methacrylate, partial reaction products of polyisocyanates with hydroxy-functional acrylates or methacrylates to form compounds having urethane and/or allophanate structural units such as are described for example in U.S. Pat. No. 4,173,682, DE-A 28 09 715 (particularly Examples adducts P, Q, R and S), EP-A 126 359 (particularly Examples 1 to 3), U.S. Pat. No. 6,465,539 (page 2, line 20 to page 4, line 55, and also in particular the Example Compounds F and G) and DE-A-198 60 041 (particularly Examples 1 to 10, 12 and also V1 to V4).

Suitable hydroxy-functional acrylates or methacrylates include compounds such 2-hydroxyethyl (meth)acrylate, polyethylene oxide mono(meth)acrylates, polypropylene oxide mono(meth)acrylates, polyalkylene oxide mono(meth)acrylates, poly(ε-caprolactone) mono(meth)acrylates, such as Tone® M100 (Dow, Schwalbach, DE), for example, 2-hydroxypropyl (meth)acrylate, 4-hydroxybutyl (meth)acrylate, 3-hydroxy-2,2-dimethylpropyl (meth)acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or technical mixtures thereof Also suitable are alcohols obtainable from the reaction of double-bond-containing acids with optionally double-bond-containing, monomeric epoxide compounds, such as, for example, the reaction products of (meth)acrylic acid with glycidyl (meth)acrylate or the glycidyl ester of Versatic acid (Cardura® E10, Resolution Nederland BV, NL).

As component A3) it is possible for example to use hydrophilicizing compounds having at least one isocyanate-reactive group, individually or as a mixture. Hydrophilicizing compounds are used especially when the polyisocyanate of the invention is to be dispersed or dissolved in water or water-containing mixtures.

By hydrophilicizing compounds are meant all ionically, potentially ionically and nonionically hydrophilicizing compounds having at least one isocyanate-reactive group. These compounds contain preferably hydroxyl and/or amino functions as their isocyanate-reactive groups.

By potentially ionically hydrophilicizing are meant those compounds which on interaction with aqueous media enter into an optionally pH-dependent dissociation equilibrium and in that way have a negative, positive or neutral charge.

As ionically or potentially ionically hydrophilicizing compounds of component A3) it is preferred to use compounds which comprise at least one isocyanate-reactive group and also at least one functionality, such as —COOY, —SO$_3$Y, —PO(OY)$_2$ (Y=H, NH$_4^+$, metal cation), —NR$_2$, —NR$_3^+$, —PR$_3^+$ (R=H, alkyl, aryl), for example.

Examples of suitable ionically or potentially ionically hydrophilicizing compounds are mono- and dihydroxycarboxylic acids, mono- and diaminocarboxylic acids, mono- and dihydroxysulphonic acids, mono- and diaminosulphonic acids and also mono- and dihydroxyphosphonic acids or mono- and diaminophosphonic acids and their salts such as dimethylolpropionic acid, dimethylolbutyric acid, hydroxypivalic acid, N-(2-aminoethyl)-β-alanine, 2-(2-aminoethylamino)ethanesulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal salts and/or ammonium salts; the adduct of sodium bisulphite with but-2-ene-1,4-diol, polyethersulphonate, the propoxylated adduct of 2-butenediol and NaHSO$_3$, described for example in DE-A 2 446 440 (page 5-9, Formula I-III), and also units which can be converted into cationic groups, such as N-methyldiethanolamine, as hydrophilic synthesis components. Preferred ionically or potential ionically hydrophilicizing compounds are those which possess carboxyl or carboxylate and/or sulphonate groups and/or ammonium groups. Particularly preferred ionic compounds are those which contain carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP-A 0 916 647, Example 1) and also of dimethylolpropionic acid.

As hydrophilic nonionic compounds it is possible to use compounds having a polyether structure, preferably alkylene oxide-based polyethers, which contain at least one hydroxyl or amino group as their isocyanate-reactive group.

These compounds with a polyether structure may be, for example, monofunctional polyalkylene oxide polyether alcohols containing on average 5 to 70, preferably 7 to 55, ethylene oxide units per molecule and containing at least 30 mol % of ethylene oxide, such as are obtainable in a manner known per se by alkoxylating suitable starter molecules (e.g. in Ullmanns Encyclopädie der technischen Chemie, 4th edition, Volume 19, Verlag Chemie, Weinheim pp. 31-38).

Examples of suitable starter molecules include saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyl-oxetane or tetrahydrofurfuryl alcohol, diethylene glycol monoalkyl ethers such as diethylene glycol monobutyl ether, for example, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexylamine), N-methyl- and N-ethylcyclohexylamine or dicyclohexylamine, and heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides that are suitable for the alkoxylation reaction are, in particular, ethylene oxide and propylene oxide, which can be used in any order, separately from one another or in a mixture, during the alkoxylation reaction, so that block polyethers or mixed polyethers are obtained.

The compounds with a polyether structure are preferably straight polyethylene oxide polyethers or mixed polyalkylene oxide polyethers, of whose alkylene oxide units at least 30 mol %, preferably at least 40 mol %, are composed of ethylene oxide units.

Very particular preference is given to monofunctional mixed polyalkylene oxide polyethers which contain at least 40 mol % of ethylene oxide units and not more than 60 mol % of propylene oxide units.

Additionally as compounds of component A3) it is possible to use low molecular weight monols, diols or polyols such as short-chain—i.e. containing 2 to 20 carbon atoms—aliphatic, araliphatic or cycloaliphatic monoalcohols, diols or triols. Examples of monoalcohols are methanol, ethanol, the isomeric propanols, butanols, pentanols, and also diacetone alcohol, fatty alcohols or fluorinated alcohols such as are available, for example, under the name Zonyl® from the company DuPont. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Examples of suitable triols are trimethylolethane, trimethylolpropane or glycerol. Preferred alcohols are 1,4-butanediol, 1,4-cyclohexanedimethanol, 1,6-hexanediol and trimethylolpropane.

The stated mono-, di- or triols are used, if at all, preferably only in amounts <0.3, in particular <0.1 equivalent per equivalent of isocyanate groups. With particular preference these mono-, di- or triols are not used.

As blocking agents of component A4) it is possible in principle to use all substances which both contain a group which on exposure to actinic radiation reacts, with polymerization, with ethylenically unsaturated compounds and possess a proton which can be abstracted or activated by Lewis acids and or Brönstedt bases.

Preferably these are acrylamides such as N-alkyl-(meth)acrylamide, N-alkyloxy-(meth)acrylamide, N-arylalkyloxy-(meth)acrylamide, N-aryloxy-(meth)acrylamide, maleimides, such as N-acetoacetyl-(meth)acrylamide, acetoacetic acid (meth)acryloyloxyalkyl esters, cyanoacetic acid (meth)acryloyl-oxyalkyl esters and malonic acid (meth)acryloyloxyalkyl diesters, such as (meth)acryloyloxyethyl acetoacetate, (meth)acryloyloxypropyl acetoacetate, (meth)acrylolyloxybutyl acetoacetate, for example.

Particular preference is given to (meth)acryloyloxyethyl acetoacetate, (meth)acryloyloxypropyl acetoacetate, (meth)acrylolyloxybutyl acetoacetate.

Very particular preference is given to methacryloyloxyethyl acetoacetate.

Of course it is possible in component A4) to use the stated ethylenically unsaturated blocking agents both in mixtures with one another and in any desired mixtures with further blocking agents other than the stated compounds of component A4), these further blocking agents not containing a group which on exposure to actinic radiation reacts, with polymerization, with ethylenically unsaturated compounds. Further blocking agents suitable for this purpose are, for example, alcohols, lactams, oximes, malonic esters, alkyl acetoacetates, triazoles, phenols, imidazoles, pyrazoles and also amines, such as butanone oxime, diisopropylamine, 1,2,4-triazole, dimethyl-1,2,4-triazole, imidazole, diethyl malonate, ethyl acetoacetate, acetone oxirne, 3,5-dimethylpyrazole, $\epsilon$-caprolactam, N-methyl-, N-ethyl-, N-(iso)propyl-, N-n-butyl-, N-iso-butyl-, N-tert-butylbenzylamine or 1,1-dimethylbenzylamine, for example, N-alkyl-N-1,1-dimethylmethylphenylamine, adducts of benzylamine with compounds having activated double bonds such as malonic esters, N,N-dimethylamino-propylbenzylamine and other optionally substituted benzylamines containing tertiary amino groups and/or dibenzylamine, or any desired mixtures of these blocking agents.

If used at all, the fraction of these further blocking agents of component A4) amount to not more than 30% by weight, preferably not more than 20% by weight, very preferably less than 10% by weight of the overall component A4).

It is preferred to use in component A4) exclusively blocking agents which in each case have at least one unsaturated function which on exposure to actinic radiation reacts, with polymerization, with ethylenically unsaturated compounds.

The ratio of the isocyanate groups to be blocked to the functional groups of the blocking agent component A4) that are capable of the blocking reaction amounts to 0.8 to 1.2 mol, preferably 1:1.

Of NCO groups from A1), usually less than 90 mol %, preferably less than 60 mol %, are reacted with the NCO-reactive groups from A2) and A3).

The amount of free NCO groups in the polyisocyanates of the invention is <5%, preferably <0.5%, in particular <0.1% by weight.

As compounds of component A5) it is possible to use all of the compounds that are known to the skilled person for the catalysis of NCO blocking, individually or in any desired mixtures. Preference is given to alkali metal and alkaline earth metal bases, such as pulverized sodium carbonate (soda) or trisodium phosphate, for example, the metal salts of the second transition group, particularly of zinc, and also tertiary amines such as 1,4-diazabicyclo[2.2.2]octanes (DABCO), tetramethylguanidine (TMG), 1,5-diazabicyclo[4.3.0]non-5-ene (DBN), 1,8-diazabicyclo[5.4.0]undec-7-ene (DBU) or phosphines such as tributylphosphine.

In component A5) it is preferred to use sodium carbonate, potassium carbonate or zinc salts, particularly zinc 2-ethylhexanoate.

Component A5) is used in an amount of 0.05% to 10%, preferably 0.1% to 3%, in particular 0.2% to 1% by weight based on the sum of component A1) to A4) in the process of the invention.

In component A6), whose use is optional, it is possible for all the auxiliaries and additives or mixtures thereof to be present that are known from polyurethane chemistry and from the chemistry of ethylenically unsaturated coating materials. Preference is given to using stabilizers in order to avoid premature polymerization, in an amount of 0.01% -1%, preferably 0.1% -0.5%, by weight based on the amount of unsaturated groups. Inhibitors of this kind are described for example in Houben-Weyl, Methoden der organischen Chemie, 4th edition, Volume XIV/1, Georg Thieme Verlag, Stuttgart 1961, page 433ff. Examples that may be mentioned include the following: sodium dithionite, sodium hydrogen sulphide, sulphur, hydrazine, phenylhydrazine, hydrazobenzene, N-phenyl-$\beta$-naphthylamine, N-phenyl-ethanoldiamine, dinitrobenzene, picric acid, p-nitrosodimethylaniline, diphenylnitrosamine, phenols, such as para-methoxyphenol, 2,5-di-tert-butylhydroquinone, 2,6-di-tert-butyl-4-methylphenol, p-tert-butylpyrocatechol or 2,5-di-tert-amylhydroquinone, tetramethylthiuram disulphide, 2-mercaptobenzothiazole, sodium dimethyldithiocarbamate, phenothiazine, N-oxyl compounds such as 2,2,6,6-tetramethylpiperidine N-oxide (TEMPO), for example, or one of its derivatives. The stabilizers can also be incorporated chemically, in which case compounds of the abovementioned classes are suitable in particular if they still carry further free aliphatic alcohol groups or primary or secondary amine groups and so then constitute stabilizers bonded chemically via urethane groups or urea groups. Particular suitability for this purpose is possessed by 2,2,6,6-tetramethyl-4-hydroxypiperidine N-oxide. Furthermore, in one preferred version, an oxygen-containing gas, preferably air, is passed in during the preparation of the polyisocyanates of the invention.

The polyisocyanates of the invention can be prepared in bulk (without solvent) or else in the presence of suitable solvents or reactive diluents. Suitable solvents are the customary paint solvents, such as butyl acetate, methoxypropyl acetate or solvent naphtha from Exxon-Chemie, Cologne, DE, as an aromatics-containing solvent, for example, and also mixtures of the aforementioned solvents. Blocking is preferably performed in the stated solvents, the solids content to be set amounting to between 10% and 90%.

Examples of suitable reactive diluents are the compounds that are known in the technology of radiation curing (cf. Römpp Lexikon Chemie, p. 491, 10th ed. 1998, Georg-Thieme-Verlag, Stuttgart), especially those having low hydroxyl contents of less than 30, preferably less than 10, mg KOH/g. By way of example mention may be made of the esters of acrylic acid or methacrylic acid, preferably of acrylic acid, with the following alcohols: isomeric butanols, pentanols, hexanols, heptanols octanols, nonanols and decanols, and also cycloaliphatic alcohols such as isobornol, cyclohexanol and alkylated cyclohexanols, dicyclopentanol, arylaliphatic alcohols such as phenoxyethanol and nonylphenylethanol, and also tetra-hydrofurfuryl alcohols. It is also possible to use alkoxylated derivatives of these alcohols. Dihydric alcohols are, for example, alcohols such as ethylene glycol, propane-1,2diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Alcohols with a higher hydricity are glycerol, trimethylolpropane, ditrimethylolpropane, pentaerythritol or dipentaerythritol or their alkoxylated derivatives.

The polyisocyanates of the invention are prepared preferably in a temperature range from 25 to 180° C., more preferably from 30 to 90° C.

In one preferred embodiment of the invention the procedure is that component A1) is introduced initially and is reacted at temperatures from 30 to 150° C. with A2), optionally A3) and A4) until the NCO content has fallen to the desired level. Components A2) to A4) can be added individually in any order or as a mixture. It is preferred to add them as a mixture. During the reaction of the stated components an oxygen-containing gas, preferably air, is preferably passed through the reaction medium.

It is also possible to introduce A2), A3) and A4) initially and to meter in A1). Further, initially introducing A2), A3), A4) or a mixture of two of these components, then metering in A1) and, finally, adding the missing constituents A2), A3) and/or A4) is possible.

It is preferred to add A5) immediately after A4). A6), if present, particularly if stabilizers are included, is added at least partly before the addition of A2). Especially when NCO-reactive solvents are used, it is advantageous not to add the solvent from A6) until all of the NCO groups have reacted or the NCO content has fallen below 1% by weight.

For each equivalent of NCO in A1) it is preferred to use 0.2 to 0.8 equivalent of A4), in particular 0.3 to 0.7 equivalent of A4). For each equivalent of NCO in A1) it is preferred to use 0.2 to 0.8 equivalent of A2), in particular 0.3 to 0.7 equivalent of A2), the sum of the equivalents of components A2) and A4) that are used being not greater than 1 per NCO group from A1).

Where the polyisocyanates of the invention are intended to be part of a coating material that is solid on application, such as of a powder coating material, for example, then the polyisocyanates of the invention should preferably be either amorphous with a glass transition temperature of 20 to 90° C., in particular 30 to 65° C., or crystalline with a melting point of 30 to 130° C., in particular of 60 to 120° C. Polyisocyanates of this kind are obtained, for example, through the use of compounds having cycloaliphatic structural units during the preparation of the polyisocyanates of the invention. For this purpose it is preferred to use cycloaliphatic diisocyanates in component A1).

The invention additionally provides coating materials comprising

B1) one or more polyisocyanates of the invention,

B2) one or more compounds comprising at least one isocyanate-reactive group and containing optionally one or more functional groups which on exposure to actinic radiation react, with polymerization, with ethylenically unsaturated compounds, B3) optionally compounds which carry functional groups which on exposure to actinic radiation react, with polymerization, with ethylenically unsaturated compounds and which contain neither NCO groups nor NCO-reactive groups, B4) optionally catalysts and B5) optionally auxiliaries and additives The compounds of component B2) can be monomeric, oligomeric or polymeric and they contain at least one, preferably two or more, isocyanate-reactive group(s).

Suitable compounds of component B2) are low molecular weight, short-chain—i.e. containing 2 to 20 carbon atoms—aliphatic, araliphatic or cycloaliphatic diols or triols. Examples of diols are ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, positionally isomeric diethyloctanediols, 1,3-butylene glycol, cyclohexanediol, 1,4-cyclohexanedimethanol, 1,6-hexanediol, 1,2- and 1,4-cyclohexanediol, hydrogenated bisphenol A (2,2-bis(4-hydroxycyclohexyl)propane), 2,2-dimethyl-3-hydroxypropyl 2,2-dimethyl-3-hydroxypropionate. Examples of suitable triols are trimethylolethane, trimethylolpropane or glycerol. Suitable alcohols of higher functionality are ditrimethylolpropane, pentaerythritol, dipentaerythritol or sorbitol.

Also suitable are relatively high molecular weight polyols such as polyester polyols, polyether polyols, hydroxy-functional acrylic resins, hydroxy-functional polyurethanes or corresponding hybrids (cf. Römpp Lexikon Chemie, pp. 465-466, 10th ed. 1998, Georg-Thieme-Verlag, Stuttgart).

The compounds of component B2) also include all compounds which have already been summarized under A2) and, in addition, isocyanate-reactive oligomeric or polymeric unsaturated compounds containing acrylate and/or methacrylate groups, alone or in combination with the aforementioned monomeric compounds. Preference is given in this context to using hydroxyl-containing polyester acrylates having an OH content of 30 to 300 mg KOH/g, preferably 60 to 200, more preferably 70 to 120.

The preparation of polyester acrylates is described in DE-A 4 040 290 (p. 3, 1. 25-p.6, 1. 24), DE-A-3 316 592 (p. 5, 1. 14-p. 11, 1. 30) and P. K. T. Oldring (Ed.), Chemistry & Technology of UV & EB Formulations for Coatings, Inks & Paints, Vol. 2, 1991, SITA Technology, London, pp. 123-135.

Likewise in B2) it is possible to use the hydroxyl-containing epoxy (meth)acrylates that are known per se and have OH contents of 20 to 300 mg KOH/g, preferably of 100 to 280 mg KOH/g, more preferably of 150 to 250 mg KOH/g or hydroxyl-containing polyurethane (meth)acrylates having OH contents of 20 to 300 mg KOH/g, preferably of 40 to 150 mg KOH/g, more preferably of 50 to 100 mg KOH/g, and also mixtures thereof of one another and mixtures with hydroxyl-containing unsaturated polyesters and also mixtures with polyester (meth)acrylates or mixtures of hydroxyl-containing unsaturated polyesters with polyester (meth)acrylates. Compounds of this kind are likewise described in P. K. T. Oldring (Ed.), Chemistry & Technology of UV & EB Formulations for Coatings, Inks & Paints, Vol. 2, 1991, SITA Technology, London pp. 37-56. Hydroxyl-containing epoxy (meth)acrylates are based in particular on reaction products of acrylic acid and/or methacrylic acid with epoxides (glycidyl compounds) of monomeric, oligomeric or polymeric bisphenol A, bisphenol F, hexanediol and/or butanediol or the ethoxylated and/or propoxylated derivatives thereof.

The compounds of component B3) may be polymers different from the compounds of component B2), such as polyacrylates, polyurethanes, polysiloxanes, and also compounds which on exposure to actinic radiation react, with polymerization, with ethylenically unsaturated compounds, are used. Groups of this kind are α,β-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units. Preference is given to acrylates and methacrylates. Examples include the reactive diluents that are known in the technology of radiation curing (cf. Römpp Lexikon Chemie, p. 491, 10th ed. 1998, Georg-Thieme-Verlag, Stuttgart) or the binders that are known in the technology of radiation curing, such as polyether acrylates, polyester acrylates, urethane acrylates, epoxy acrylates, provided that they have a hydroxyl group content of less than 30, preferably less than 20, more preferably less than 10 mg KOH/g.

Mention may be made by way of example of the esters of acrylic acid or methacrylic acid as a constituent of B3), preferably of acrylic acid, with the alcohols which follow. Monohydric alcohols are the isomeric butanols, pentanols, hexanols, heptanols, octanols, nonanols and decanols, and also cycloaliphatic alcohols such as isobornol, cyclohexanol and alkylated cyclohexanols, dicyclopentanol, arylaliphatic alcohols such as phenoxyethanol and nonylphenylethanol, and also tetrahydrofurfuryl alcohols. It is also possible to use alkoxylated derivatives of these alcohols. Dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Alcohols with a higher hydricity are glycerol, trimethylolpropane, ditrimethylolpropane, pentaerythritol or dipentaerythritol or their alkoxylated derivatives.

As a constituent of B4), in order to accelerate the curing of the blocked isocyanates with the respective hydrogen-containing co-reactants such as alcohols, amines and the mixed alcohol-containing and amine-containing co-reactants, it is possible in principle, to use Lewis acids. Suitability in this case is possessed by at least divalent ions of Lewis acids. For example, salts of zinc, of titanium, of zirconium and of bismuth are suitable. Preference is given to compounds of zinc and of zirconium, with zinc 2-ethylhexanoate being particularly preferred.

The amount of the catalyst B4) can be adapted by the skilled person to the requirements of the cure, taking into account curing temperature. Suitable amounts are, for example, 0.01% to 2% by weight, preference being given to the use of 0.05% to 1% by weight, more preferably 0.07% to 0.6% by weight of catalyst based on total solids content. If operation is to take place at relatively high baking temperatures, i.e. above about 160° C., it may also be possible to do without the catalyst.

As component B5) it is possible for auxiliaries or adjuvants to be present that are customary in the technology of varnishes, paints, printing inks, sealants and adhesives. These also include initiators which can be activated by actinic radiation and which trigger free-radical polymerization of the corresponding polymerizable groups. Photoinitiators, activated by UV or visible light, are preferred in this context. Photoinitiators are commercially marketed compounds which are known per se, a distinction being made between unimolecular (Type I) and bimolecular (Type II) initiators. Suitable (Type I) systems are like aromatic ketone compounds, e.g. benzophenones in combination with tertiary amines, alkylbenzophenones, 4,4'-bis(dimethylamino)benzophenone (Michler's ketone), anthrone and halogenated benzophenones or mixtures of the stated types. Of further suitability are (Type II) initiators such as benzoin and its derivatives, benzil ketals, acylphosphine oxides, e.g. 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. If the coating material of the invention is to be processed on an aqueous basis, it is preferred to use photoinitiators which can easily be incorporated into aqueous coating materials. Examples of such products are Irgacure® 500, Irgacure® 819 DW (Ciba, Lampertheim, DE), Esacure® KIP (Lamberti, Aldizzate, Italy). Mixtures of these compounds can also be used.

Where the curing of the polymerizable constituents is to be initiated thermally as well, suitable compounds of component B5) include peroxy compounds such as diacyl peroxides, e.g. benzoyl peroxide, alkyl hydroperoxide such as diisopropylbenzene monohydroperoxide, alkyl peresters such as tert-butyl perbenzoate, dialkyl peroxides such as di-tert-butyl peroxide, peroxydicarbonates such as dicetyl peroxide dicarbonate, inorganic peroxides such as ammonium peroxodisulphate, potassium peroxodisulphate or else azo compounds such as 2,2'-azobis[N-(2-propenyl)-2-methylpropionamide], 1-[(cyano-1-methylethyl)-azo]formamide, 2,2'-azobis(N-butyl-2-methylpropionamide), 2,2'-azobis(N-cyclohexyl-2-methylpropionamide), 2,2'-azobis{2-methyl-N-[2-(1-hydroxybutyl)]-propionamide}, 2,2'-azobis{2-methyl-N-[2-(1-hydroxybutyl)]propionamide}, 2,2'-azobis{2-methyl-N-[1,1-bis(hydroxymethyl)-2-hydroxyethyl]propionamide}, and additionally benzpinacol and its silylated derivatives. Preferred for aqueous coating systems are compounds which are water-soluble or are present as aqueous emulsions. These free-radical initiators can be combined in a known way with accelerators.

Adjuvants which can be used as well are stabilizers already described under A5), light stabilizers such as UV absorbers and sterically hindered amines (HALS), and also antioxidants, fillers and also paint auxiliaries, examples being anti-settling agents, defoaming and/or wetting agents, flow control agents, reactive diluents, plasticizers, catalysts, auxiliary solvents and/or thickeners and also pigments, dyes and/or matting agents. The use of light stabilizers and the various types are described by way of example in A. Valet, Lichtschutzmittel für Lacke, Vincentz Verlag, Hanover, 1996.

The polyisocyanates of the invention can be used for preparing paints, coatings, sizes, adhesives, printing inks and shaped articles.

The invention further provides a process for preparing the coating materials of the invention, which involves mixing the constituents of the coating material with one another in any order at temperatures of −20 to 120° C., preferably 10 to 90° C., in particular 20 to 60° C. The coating material in this case may at room temperature be solid, liquid, in solution or in dispersion. Solid coating materials are prepared with the equipment that is customary in powder coating technology, in particular with extruders, mills and classifiers. For liquid, dissolved or dispersed coating materials the agitator mechanisms and dispersion equipment that are known to the skilled person from the coating technology of liquid systems are suitable.

The ratio of blocked isocyanate groups in B1) to isocyanate-reactive groups in B2) is preferably 0.5 to 2, in particular 0.8 to 1.5, more preferably 1:1.

The compounds B3) are used optionally in amounts up to 75% by weight, preferably below 50% by weight, based on the coating material, and with particular preference not at all.

The coating materials of the invention can be applied by the customary techniques to any of a very wide variety of substrates, such as by spraying, rolling, knife coating, pouring, spraying, brushing, impregnating, dipping, printing or other transfer methods, for example. Suitable substrates are, for example, wood, metal, including in particular metal as used in the applications known as wire, coil, can or container coating, and also plastic, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728T1), paper, leather, textiles, felt, glass, electronic assemblies or mineral substrates. It is also possible to paint substrates which are composed of different materials from among those stated, or substrates which have already been coated. A further possibility is to apply the coating materials to a substrate only temporarily, then to cure them partly or fully and to detach them again, in order to produce sheets, for example.

The applied film thicknesses (prior to curing) are typically between 0.5 and 5000 μm, preferably between 5 and 1500 μm, more preferably between 15 and 1000 μm.

Radiation curing is accomplished preferably by exposure to high-energy radiation, i.e. UV radiation or daylight, e.g. light with a wavelength of 200 to 750 nm, or by bombardment with high-energy electrons (electron beams, 150 to 300 keV). Examples of suitable radiation sources for light or UV light include high-pressure mercury vapour lamps, it being possible for the mercury vapour to have been modified by doping with other elements such as gallium or iron. Lasers, pulsed lamps (known under the designation UV flashlight lamps), halogen lamps or excimer lamps are likewise possible. The lamps may be installed stationarily, so that the material to be irradiated is moved past the radiation source by means of a mechanical apparatus, or the lamps may be mobile and the material for irradiation does not change its location during the cure. The radiation dose that is normally sufficient for crosslinking in the case of UV curing is situated in the range from 80 to 5000 mJ/cm$^2$.

Irradiation can where appropriate also be carried out in the absence of oxygen, such as under an inert gas atmosphere or oxygen-reduced atmosphere, for example. Suitable inert gases are preferably nitrogen, carbon dioxide, noble gases or combustion gases. Irradiation can also take place with the coating covered with media that are transparent to the radiation. Examples thereof are, for example, polymeric films, glass or liquids such as water.

The nature and concentration of any initiator used are to be varied in a manner known to the skilled person in accordance with the radiation dose and curing conditions.

Particular preference is given to carrying out curing using high-pressure mercury lamps in stationary installations. Photoinitiators are then used in concentrations of 0.1% to 10% by weight, more preferably 0.2% to 3.0% by weight, based on the solids of the coating. These coatings are cured using preferably a dose of 200 to 3000 mJ/cm$^2$ as measured in the wavelength range from 200 to 600 nm.

The coating material of the invention additionally cures by exposure to thermal energy. This thermal energy can be introduced by radiation, thermal conduction and/or convection into the coating, and it is customary to employ the ovens, near-infrared lamps and/or infrared lamps that are commonplace in coating technology. Supplying thermal energy triggers the crosslinking reaction of the blocked isocyanate group, groups with the isocyanate-reactive groups of the coating material.

Since through exposure to actinic radiation and the generation of thermal energy two independent chemical mechanisms are set in operation, the sequence of actinic radiation/thermal energy and hence the sequence in which the mechanisms take place can be combined arbitrarily. It is preferred first to remove any organic solvent and/or water that is present, using the methods customary in coating technology. In one preferred version, subsequently, curing is carried out wholly or partly by exposure to actinic radiation. Immediately thereafter or else later, and in the same place or elsewhere, the thermal cure can take place. In this way it is possible, for example, first to produce flexible coatings, which withstand deformation of the substrate without damage, and then to subject these coatings to further, thermal curing. Thus it is possible, for example, to coat metal, which has already been coated, in the form of what are known as coils and to cure the coatings initially by exposure to actinic radiation to give a flexible coating. Particular parts can then be detached from the coated coils by methods known to the skilled person, such as by punching, for example, and can be brought mechanically into a new form without the coating suffering damage and, for example, tearing. Subsequently, by means of thermal energy, the crosslinking reaction of the cyclic ketone groups with the isocyanate-reactive groups of the coating material is triggered, thereby producing highly resistant coatings which are suitable, for example, inter alia, as clearcoat materials for car bodies or for parts used in car construction.

In a further version first of all a polymeric film is coated and the coating is cured by actinic radiation to give a layer which is resistant to blocking but elastic. This film can subsequently be drawn over a moulding and bonded therewith. This thermoforming, as it is known, takes place preferably at elevated temperatures, and during the forming operation, at the end of which and/or thereafter the temperature is reached that is necessary for crosslinking the blocked isocyanate groups with the isocyanate-reactive groups of the coating material, so that the coating crosslinks to a highly resistant layer.

In another version it is also possible first to carry out crosslinking by thermal energy and then further to crosslink the surfaces of the resultant coated substrate or of the part consisting only of the coating material of the invention by exposure to actinic radiation at temperatures of 0 to 300° C., preferably 23 to 200° C., in particular of 80 to 150° C. In particular it can be advantageous to combine the method of thermal curing of coatings, known to the skilled person as in-mould coating, with a subsequent crosslinking by actinic radiation outside the mould.

EXAMPLES

Unless remarked otherwise, all percentages are to be understood as being percent by weight (% by weight).

The viscosity measurements were carried out using a cone-plate viscometer (SM-KP), Viskolab LC3/ISO from Paar Physica, Ostfildern, DE in accordance with ISO/DIS 3219: 1990.

The NCO contents were determined in % by back-titration with 0.1 mol/l hydrochloric acid after reaction with butylamine, on the basis of DIN EN ISO 11909.

Acid number: reported as mg KOH/g sample, titration with 0.1 mol/l NaOH solution against bromothymol blue (ethanolic solution), colour change from yellow via green to blue, based on DIN 3682.

Hydroxyl number: reported as mg KOH/g sample, titration with 0.1 mol/l meth. KOH solution after cold acetylation with acetic anhydride with catalysis by dimethylaminopyridine, based on DIN 53240.

Desmodur® N3600: HDI polyisocyanate based on isocyanurate, with a viscosity of 1200 mPas/23° C. and an NCO content of 23.4%, Bayer MaterialScience AG, Leverkusen, DE. Desmodur® VP LS 2102: HDI polyisocyanate based on allophanate and isocyanurate, with a viscosity of 300 mPas/23° C. and an NCO content of 20.0%, Bayer MaterialScience AG, Leverkusen, DE.

Desmodur® LS 2010: HDI polyisocyanate based on isocyanurate, with a viscosity of 6000 mPas/20° C. and an NCO content of 10.0%, Bayer MaterialScience AG, Leverkusen, DE.

Polyol 1: Desmophen® VP LS 2089: unsaturated polyester polyol, 75% in butyl acetate, Bayer MaterialScience AG, Leverkusen, DE.

Irgacure® 184: hydroxycyclohexyl phenyl ketone, Ciba Spezialitätenchemie, Lampertheim, DE.

Darocure® 1173: 2-hydroxy-2-methyl-1-phenylpropan-1-one, Ciba Spezialitätenchemie, Lampertheim, DE.

Example 1

Preparation of PIC 1

A 3-necked flask with reflux condenser and air introduction (about 1 l/h) was charged with 254.93 g of Desmodur® N3600 and 0.022 g of dibutyltin dilaurate (DBTL) (Desmorapid® Z, Bayer AG, Leverkusen, DE) and this initial charge was heated to 70° C. Subsequently at 70° C. a solution of 0.5 g of 2,6-di-tert-butyl-4-methylphenol in 115.00 g of hydroxyethyl acrylate was added and stirring was continued until the NCO content was constant. The batch was then cooled to 50° C. and a solution of 0.5 g of 2,6-di-tert-butyl4-methylphenol in 91.01 g of acetoacetoxyethyl methacrylate was added. Then 2.72 g of zinc 2-ethylhexanoate were added in such a way that the temperature did not exceed 70° C. Stirring was then continued at this temperature until the NCO content had dropped <0.4%. Then 5.24 g of isobutanol were added and stirring was continued for an hour. After the batch had cooled to 50° C., 2.72 g of paraformaldehyde in 27.2 g of isobutanol and 0.073 g of a 30% strength methanolic sodium methoxide solution were added with stirring. Stirring was continued for 3.5 h and then the batch was cooled to room temperature. This gave a product having a viscosity of 15 200 mPas/23° C.

Example 2

Preparation of PIC 2

A 3-necked flask with reflux condenser and air introduction (about 1 l/h) was charged with 239.22 g of Desmodur® N3600 and 0.02 g of dibutyltin dilaurate (Desmorapid® Z, Bayer AG, Leverkusen, DE) and this initial charge was heated to 70° C. Then a solution of 0.5 g of 2,6-di-tert-butyl-4-methylphenol in 86.38 g of hydroxypropyl acrylate was added dropwise and stirring was continued until the NCO content was constant. The batch was then cooled to 40° C. and a solution of 0.5 g of 2,6-di-tert-butyl-4-methylphenol in 170.81 g of acetoacetoxyethyl methacrylate was added. Then 0.05 g of zinc 2-ethylhexanoate was added dropwise over the course of an hour at such a slow rate that the temperature did not exceed 50° C., after which stirring was continued until the NCO content was now only 1%. Then a further 28.46 g of acetoacetoxy ethyl methacrylate were added and stirring was continued until the NCO content had dropped <0.4%. Finally 2.64 g of dibutyl phosphate were added. This gave a product having a viscosity of 25 000 mPas/23° C.

Example 3

Preparation of PIC 3

A 3-necked flask with reflux condenser and air introduction (about 1 l/h) was charged with 259.39 g of Desmodur® VP LS 2102 and 0.02 g of dibutyltin dilaurate (Desmorapid® Z, Bayer AG, Leverkusen, DE) and this initial charge was heated to 70° C. Then at 70° C. a solution of 0.5 g of 2,6-di-tert-butyl-4-methylphenol in 80.29 g of hydroxypropyl acrylate was added dropwise and stirring was continued until the NCO content was constant. The batch was then cooled to 40° C. and a solution of 0.5 g of 2,6-di-tert-butyl-4-methylphenol in 158.75 g of acetoacetoxyethyl methacrylate was added. At this point 0.05 g of zinc 2-ethylhexanoate was added slowly dropwise over the course of an hour, during which the temperature was not allowed to exceed 50° C. Stirring was then continued until the NCO content was <0.4%. Finally 0.50 g of dibutyl phosphate was added. This gave a product having a viscosity of 7800 mPas/23° C.

Example 4

Preparation of PIC 4

A 3-necked flask with reflux condenser and air introduction (about 1 l/h) was charged with 330.83 g of Desmodur® LS 2010 and 0.02 g of dibutyltin dilaurate (Desmorapid® Z, Bayer AG, Leverkusen, DE) and this initial charge was heated to 70° C. Then a solution of 0.5 g of 2,6-di-tert-butyl-4-methylphenol in 56.29 g of hydroxypropyl acrylate was added dropwise and stirring was continued until the NCO content was constant. The batch was then cooled to 40° C. and a solution of 0.5 g of 2,6-di-tert-butyl-4-methylphenol in solution in 111.30 g of aceto-acetoxyethyl methacrylate was added. Thereafter 0.05 g of zinc 2-ethylhexanoate was added dropwise over the course of an hour at such a slow rate that the temperature did not exceed 50° C. and stirring was continued until the NCO content was <0.4%. Finally 0.50 g of dibutyl phosphate was added. This gave a product having a viscosity of 47 200 mPas/23° C.

Example 5

Preparation of Polyol 1

A pressure vessel reactor made from V4A steel was charged with 1200 g of butyl acetate which was heated to 155° C. (internal reactor pressure: approximately 2.7 bar). Over the course of 3 h a solution of 924.0 g of glycidyl methacrylate, 805.2 g of methyl methacrylate and 818.4 g of n-butyl acrylate was then metered in. At the same time, over 3.5 h, a solution of 92.4 g of di-tert-butyl peroxide (Peroxan® DB, Pergan GmbH, Bocholt, DE) in 160 g of butyl acetate was metered in. Stirring was continued for an hour, after which the batch was cooled to 40° C. and finally filtered through a T5500 depth filter (Seitz-Filter-Werke, Bad Kreuznach, DE).

Example 6

Preparation of Polyol 2

A three-necked flask with reflux condenser, stirrer and gas introduction tube was charged with 175.93 g of the product from Example 5, 18.56 g of acrylic acid, 0.197 g of tin 2-ethylhexoate (Desmorapid® SO, Bayer AG Leverkusen, DE), 0.39 g of 2,6-di-tert-butyl-4-methylphenol, 1.96 mg of 2,2,6,6-tetramethylpiperidine-1-oxyl and 4.91 g of butyl acetate and this initial charge was heated to 90° C., in the course of which nitrogen was introduced, and reacted for 22 h. The result was a product having a viscosity of 1130 mPas/23° C., an OH number of 88.7 mg KOH/g and an acid number of 6.2 mg KOH/g.

Example 7

Use examples of the formulations of the invention:

|       | 7a      | 7b      | 7c      | 7d      | 7e      |
|-------|---------|---------|---------|---------|---------|
| PIC 1 | 16.12 g |         |         |         | 16.12 g |
| PIC 2 |         | 13.78 g |         |         |         |
| PIC 3 |         |         | 14.09 g |         |         |
| PIC 4 |         |         |         | 15.45 g |         |

-continued

|  | | | | | |
|---|---|---|---|---|---|
| Polyol 1 | 3.88 g | 6.22 g | 5.91 g | 4.55 g | 3.88 g |
| Polyol 2 | | | | | |
| Irgacure ® 184 | 0.6 g | 0.6 g | 0.6 g | 0.6 g | |
| Darocur ® 1173 | | | | | 0.6 g |

|  | 7f | 7g | 7h | 7i | 7j |
|---|---|---|---|---|---|
| PIC 1 | 13.78 g | 13.01 g | | | |
| PIC 2 | | | 9.96 g | | |
| PIC 3 | | | | 10.33 g | |
| PIC 4 | | | | | 12.07 g |
| Polyol 1 | 3.88 g | | | | |
| Polyol 2 | | 6.99 g | 10.04 g | 9.67 g | 7.93 g |
| Irgacure ® 184 | | 0.6 g | 0.6 g | 0.6 g | 0.6 g |
| Darocur ® 1173 | 0.6 g | | | | |

The formulations of the invention were prepared in accordance with the tables above by stirring the components with one another and applying them to a glass plate using a spiral applicator (film thickness: approximately 60 μm). After a flash-off phase of 20 minutes at 25° C., curing was carried out by three different methods:

Operation A: Exposure to UV (belt unit, 1 lamp, high-pressure mercury lamp 80 W/cm lamp length [CK lamp, IST, Metzingen, DE], irradiation being carried out two times with a belt speed of 5 m/min).

Operation B: Heating the coated gas plate in a convection oven, 20 min/140° C.

Operation C: Application of Operation A and then of Operation B.

After the test specimen had cooled, testing was carried out manually to determine whether the coating is tacky, soft (finger print still visible) or hard. In addition, the König pendulum hardness (DIN 53157) and the chemical resistance with 100 double rubs were measured. For the latter test a cotton pad soaked with methyl ethyl ketone (MEK) was passed back and forth with a force of approximately one kilo over each of the surfaces until there was visible deterioration of the paint film (clouding or detachment from the substrate) (100 double rubs maximum).

Results of curing by Operations A-C:

The formulations 7a-7j were processed at 23° C. in a closed vessel >8 h, i.e. the formulations, diluted with butyl acetate to spray viscosity (25 s efflux time from the DIN4 cup), still gave an efflux time below 50 s at least after 8 h of storage.

It is apparent that the curing mechanism A) leads to partial curing of the coatings, B) likewise leads to curing in the majority of cases, but only the combination cure C) leads to complete curing. The formulations have a processing time which is significantly above that of a dual system with free isocyanate groups (Comparative Example 10).

Example 8

In accordance with the table below, and in analogy to Example 7, coatings were produced, cured according to Operations A, B or C, and tested for their stability towards MEK. In contradistinction to Example 7, DBU was added here, as catalyst for the deblocking, as simultaneous initiation of the thermal crosslinking.

|  | 8a | 8b | 8c | 8d |
|---|---|---|---|---|
| PIC 2 | 13.78 | 13.78 g | 13.78 g | 13.78 g |
| Polyol 1 | 6.22 | 6.22 g | 6.22 g | 6.22 g |
| DBU | | 0.0206 g | 0.103 g | 0.206 |
| Irgacure ® 184 | 0.6 g | 0.6 g | 0.6 g | 0.6 g |
| Worlee Add 101 | 0.2 g | 0.2 g | 0.2 g | 0.2 g |

DBU = 1,8-diazabicyclo[5.4.0]undec-7-ene

Worlee Add 101: polyacrylate-based flow control assistant from Worlee-Chemie GmbH, Lauenburg, DE Results of curing by operations A-C:

|  | Tactility after | | | Pendulum hardness after | | | MEK double rubs after | | |
|---|---|---|---|---|---|---|---|---|---|
|  | A | B | C | A | B | C | A | B | C |
| 7a | hard | tacky | hard | 112 s | — | 187 s | >100 | — | >100 |
| 7b | soft | hard | hard | 70 s | 137 s | 193 s | >100 | >100 (-) | >100 |
| 7c | soft | tacky | hard | 32 s | — | 148 s | >100 (-) | — | >100 |
| 7d | soft | tacky | soft | 14 s | — | 30 s | >100 (-) | — | >100 (-) |
| 7e | hard | tacky | hard | 96 s | — | 188 s | >100 | — | >100 |
| 7f | hard | hard | hard | 63 s | 84 s | 188 s | >100 | >100 | >100 |
| 7g | hard | soft | hard | 96 s | 6 s | 177 s | >100 | 10 | >100 |
| 7h | soft | hard | hard | 115 s | 195 s | 188 s | >100 (-) | >100 | >100 |
| 7i | soft | hard | hard | 113 s | 197 s | 173 s | >100 (-) | >100 (-) | >100 |
| 7j | soft | soft | hard | 48 s | 96 s | 88 s | 50-70 | 40 | 80 |

>100: at 100 double rubs, no deterioration in the paint film was apparent

>100 (-): after 100 double rubs the film surface suffered attack

|    | Tactility |      |      | Pendulum hardness after |       |       | MEK double rubs |          |      |
|----|-----------|------|------|-------|-------|-------|----------|----------|------|
|    | A    | B    | C    | A     | B     | C     | A        | B        | C    |
| 8a | soft | hard | hard | 91 s  | 103 s | 191 s | >100 (-) | >100 (-) | >100 |
| 8b | soft | soft | hard | 87 s  | 46 s  | 183 s | >100     | >100 (-) | >100 |
| 8c | soft | soft | hard | 86 s  | 33 s  | 191 s | >100 (-) | >100 (-) | >100 |
| 8d | soft | soft | hard | 61 s  | 73 s  | 185 s | >100 (-) | >100 (-) | >100 |

>100: at 100 double rubs, no deterioration in the paint film was apparent
>100 (-): after 100 double rubs the film surface suffered attack It is evident that the catalysis improves the curing by method B) relative to Example 7. Each cure, thermal or UV, alone [B) or A)] leads only to partial curing. Only the combination results in optimum properties.

Example 9

In accordance with the table below, the formulations were prepared and were stored at room temperature or 60° C. for the purpose of assessing the pot life.

|              | 9a      | 9b      | 9c      |
|--------------|---------|---------|---------|
| PIC 2        | 13.78 g | 13.78 g | 13.78 g |
| Polyol 1     | 6.22 g  | 6.22 g  | 6.22 g  |
| DBU          | 0.0206 g| 0.103 g | 0.206   |
| Darocur ® 1173 | 0.6 g | 0.6 g   | 0.6 g   |

DBU = 1,8-diazabicyclo[5.4.0]undec-7-ene

Pot life of Formulations 9a-c:

|              | 1 h  | 5 h  | 3 days    | 6 days    | 14 days         |
|--------------|------|------|-----------|-----------|-----------------|
| 9a at RT     | n.c. | n.c. | n.c.      | n.c.      | n.c.            |
| 9b at RT     | n.c. | n.c. | n.c.      | n.c.      | n.c.            |
| 9c at RT     | n.c. | n.c. | turbidity | turbidity | severe turbidity|
| 9a at 60° C. | n.c. | n.c. | solid     | solid     | solid           |
| 9b at 60° C. | n.c. | n.c. | solid     | solid     | solid           |
| 9c at 60° C. | n.c. | n.c. | solid     | solid     | solid           | n.c.: no change apparent

Since here, as in Example 8, DBU is present as a catalyst for the thermal crosslinking, the coating formulations no longer possess an "unlimited" storage stability as in Example 7. Despite the addition of the catalyst, the formulations are stable on storage for more than 5 hours at RT and at 60° C. The processing time is significantly beyond that of a dual system with free isocyanate groups (Comparative Example 10).

Comparative Example 10

The dual-cure system with free isocyanate groups from Example 2 of EP-A 928 800 was reproduced. The formulation was adjusted with methoxypropyl acetate to spray viscosity (25 s efflux time from the 4 mm DIN cup) and the time taken for the efflux time to double was measured. After 5.5 h the efflux time was 50 s.

Dual-cure systems with free isocyanate groups customarily have processing times of below 8 h.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate which:
   A) comprises at least one thermally reversibly blocked NCO group whose blocking agent is selected from the group consisting of (meth)acryloyloxyethyl acetoacetate, (meth)acryloyloxypropyl acetoacetate, (meth)acryloyloxybutyl acetoacetate and combinations thereof,
   B) has exclusively aliphatically and/or cycloaliphatically attached isocyanate groups, and
   C) is prepared from an organic polyisocyanate having an NCO functionality >2.

2. The polyisocyanate of claim 1 which further comprises one or more groups which on exposure to actinic radiation reacts, with polymerization, with ethylenically unsaturated compounds, wherein the one or more groups is different from the (meth)acryolyl group of the at least one thermally reversibly blocked NCO group.

3. A process for preparing the polyisocyanate according to claim 1, which comprises reacting with one another:
   A1) one or more organic polyisocyanates having exclusively aliphatically and/or cycloaliphatically attached isocyanate groups and an NCO functionality >2 with
   A2) optionally one or more compounds which are different from A4 and comprise at least one isocyanate-reactive group and at least one group which on exposure to actinic radiation reacts, with polymerization, with ethylenically unsaturated compounds,
   A3) optionally further isocyanate-reactive compounds other than the compounds of component A2) and A4), and
   A4) a blocking agent selected from the group consisting of (meth)acryloyloxyethyl acetoacetate, (meth)acryloyloxypropyl acetoacetate, (meth)acryloyloxybutyl acetoacetate and combinations thereof,
   A5) optionally in the presence of one or more catalysts and solvents, reactive diluents and/or auxiliaries and additives.

4. A process for preparing the polyisocyanate according to claim 3, wherein in A2) acrylates, methacrylates, maleates, fumarates, maleimdies, acrylamides, vinyl ethers, propenyl ethers, allyl ethers and/or compounds containing dicyclopentadienyl units are used which contain at least one isocyanate-reactive group.

5. A process for preparing polyisocyanate according to claim 3, wherein (i) for each equivalent of NCO in A1) 0.2 to 0.8 equivalent of A4) is used, (ii) for each equivalent of NCO in A1) 0.2 to 0.8 equivalent of A2) is used, and (iii) the sum of the equivalents of components A2) and A4) that are used is not greater than 1 per NCO group from A1).

6. The process for preparing the polyisocyanate according to claim 3, wherein A1 comprises a uretdione, carbodiimide, isocyanurate, iminooxadiazinedione, biuret, urethane, allophanate, oxadiazinetrione or acylurea structure.

7. A coating material comprising
B1) one or more polyisocyanates according to claim 1,
B2) one or more compounds comprising at least one isocyanate-reactive group and containing optionally one or more functional groups which on exposure to actinic radiation react, with polymerization, with ethylenically unsaturated compounds,
B3) optionally compounds which carry functional groups which on exposure to actinic radiation react, with polymerization, with ethylenically unsaturated compounds and which contain neither NCO groups nor NCO-reactive groups,
B4) optionally catalysts and
B5) optionally auxiliaries and additives.

8. A substrate coated with coatings obtained from one or more polyisocyanates according to claim 1.

9. A polyisocyanate which:
A) comprises at least one thermally reversibly blocked NCO group whose blocking agent is selected from the group consisting of (meth)acryloyloxyethyl acetoacetate, (meth)acryloyloxypropyl acetoacetate, (meth)acryloyloxybutyl acetoacetate and combinations thereof and
B) has exclusively aliphatically and/or cycloaliphatically attached isocyanate groups,
C) comprises a uretdione, carbodiimide, isocyanurate, iminooxadiazinedione, biuret, urethane, allophanate, oxadiazinetrione or acylurea structure, and
D) is prepared from an organic polyisocyanate having an NCO functionality of >2.

10. The polyisocyanate of claim 9 which further comprises one or more groups which on exposure to actinic radiation reacts, with polymerization, with ethylenically unsaturated compounds, wherein the one or more groups is different from the (meth)acryolyl group of the at least one thermally reversibly blocked NCO group.

11. A process for preparing the polyisocyanate according to claim 9, which comprises reacting with one another:
A1) one or more organic polyisocyanates having exclusively aliphatically and/or cycloaliphatically attached isocyanate groups and comprising a uretdione, carbodiimide, isocyanurate, iminooxadiazinedione, biuret, urethane, allophonate, oxadiazinetrione or acylurea structure with
A2) optionally one or more compounds which are different from A4 and comprise at least one isocyanate-reactive group and at least one group which on exposure to actinic radiation reacts, with polymierzation, with ethylenically unsaturated compounds,
A3) optionally further isocyanate-reactive compounds other than the compounds of component A2) and A4), and
A4) a blocking agent selected from the group consisting of (meth)acryloyloxyethyl acetoacetate, (meth)acryloyloxypropyl acetoacetate, (meth)acryloyloxybutyl acetoacetate and combinations thereof,
A5) optionally in the presence of one or more catalysts, solvents, reactive diluents, auxiliaries and/or additives, wherein A1) has an NCO functionality of >2.

12. A process for preparing the polyisocyanate according to claim 11, wherein A2) acrylates, methacrylates, maleates, fumarates, maleimides, acrylamides, vinyl ethers, propenyl ethers, allyl ethers and/or compounds containing dicyclopentadienyl units are used which contain at least one isocyanate-reactive group.

13. A process for preparing the polyisocyanate according to claim 11, wherein (i) for each equivalent of NCO in A1) 0.2 to 0.8 equivalent of A4) is used, (ii) for each equivalent of NCO in A1) 0.2 to 0.8 equivalent of A2) is used, and (iii) the sum of the equivalents of compounds A2) and A4) that are used is not greater than 1 per NCO group from A 1).

14. A coating material comprising
B1) one or more polyisocyanates according to claim 9,
B2) one or more compounds comprising at least one isocyanate-reactive group and containing optionally one or more functional groups which on exposure to actinic radiation react, with polymerization, with ethylenically unsaturated compounds,
B3) optionally compounds which carry functional groups which on exposure to actinic radiation react, with polymerization, with ethylenically unsaturated compounds and which contain neither NCO groups nor NCO-reactive groups,
B4) optionally catalysts and
B5) optionally auxiliaries and additives.

15. A substrate coated with coatings obtained from one or more polyisocyanates according to claim 14.

16. A coating material comprising:
B1) one or more polyisocyanates comprises a reaction product of:
A1) one or more organic polyisocyantes having exclusively aliphatically and/or cycloaliphatically attached isocyanate groups, wherein the organic polyisocyanates have an NCO functionality of >2;
A2) optionally one or more compounds, different from A4), which comprise at least one isocyanate-reactive group and contain at least one group which on exposure to actinic radiation reacts, with polymerization, with ethylenically unsaturated compounds,
A3) optionally further isocyanate-reactive compounds other than the compounds of component A2) and A4), and
A4) a blocking agent selected from the group consisting of (meth)acryloyloxyethyl acetoacetate, (meth)acryloyloxypropyl acetoacetate, (meth)acryloyloxybutyl acetoacetate and combinations thereof,
A5) optionally in the presence of one or more catalysts and/or solvents, reactive diluents and/or auxiliaries and additives,
B2) one or more compounds comprising at least one isocyanate-reactive group and containing optionally one or more functional groups which on exposure to actinic radiation react, with polymerization, with ethylenically unsaturated compounds,
B3) one or more compounds which carry functional groups which on exposure to actinic radiation react, with polymerization, with ethylenically unsaturated compounds and which contain neither NCO groups nor NCO-reactive groups,
B4) optionally catalysts and
B5) optionally auxiliaries and additives.

17. The coating material of claim 16, wherein A1) comprises a uretdione, carbodiimide, isocyanurate, iminooxadiazinedione, biuret, urethane, allophonate, oxadiazinetrione or acylurea structure.

18. The coating material of claim 16, wherein (i) for each equivalent of NCO in A1) 0.2 to 0.8 equivalent of A4) is used, (ii) for each equivalent of NCO in A1) 0.2 to 0.8 equivalent of A2) is used, and (iii) the sum of the equivalents of components A2) and A4) that are used is not greater than 1 per NCO group from A1).

* * * * *